United States Patent [19]

Brown

[11] 4,138,198
[45] Feb. 6, 1979

[54] TAPERED SHANK BALL STUD ASSEMBLY WITH COLLAPSIBLE WASHER

[75] Inventor: Trevor J. Brown, Rochester, Mich.

[73] Assignee: General Motors Corporation, Detroit, Mich.

[21] Appl. No.: 816,259

[22] Filed: Jul. 18, 1977

[51] Int. Cl.² .......................... F16B 9/02; F16C 11/06
[52] U.S. Cl. ................................ 403/247; 29/526 R; 85/62; 151/7; 151/38; 403/76
[58] Field of Search ..................... 151/38, 14 R, 7; 403/247, 259, 261, 77, 76, 68; 85/62, 50 R, 1 JP; 29/428, 526, 149.5 B, 469

[56] References Cited

U.S. PATENT DOCUMENTS

| 2,476,561 | 7/1949 | Pedersen | 85/62 |
| 3,009,722 | 11/1961 | Augustin | 85/1 JP X |
| 3,018,519 | 1/1962 | Morin et al. | 151/7 X |
| 3,549,167 | 12/1970 | Haverbeck | 403/76 X |

*Primary Examiner*—Ramon S. Britts
*Attorney, Agent, or Firm*—Arthur N. Krein

[57] ABSTRACT

A tapered shank ball stud, as used in an articulated joint assembly, has its tapered shank secured in seated engagement in the tapered aperture of a support member in such an assembly by a lock nut threaded onto the externally threaded end of the ball stud with a collapsing washer of original C-shaped annulus configuration sandwiched between the member and the lock nut, the washer being operative as the nut is driven onto the ball stud to effect axial movement of the ball stud to fully seat the tapered shank portion thereof in the tapered aperture in the support member thereby preventing rotation of the ball stud as the lock nut is torqued down to effect collapsing of the washer into a final flat ring-like washer configuration.

4 Claims, 4 Drawing Figures

TAPERED SHANK BALL STUD ASSEMBLY WITH COLLAPSIBLE WASHER

This invention relates to articulated joint assemblies and, in particular, to a tapered shank ball stud fastener assembly for use in an articulated joint assembly.

Articulated joint assemblies are well known and are commonly used, for example, in automotive vehicles as part of the front end suspension system thereof. In such applications, the front or dirigible wheels are independently connected to the vehicle frame through such articulated joint assemblies so as to allow each front wheel to rise and fall, due to road surface irregularities without appreciably affecting the opposite wheel.

In such an assembly, a first support member is operatively connected to a second support member through a ball and socket joint, the socket housing or portion of which may be formed integral with the second support member or formed as a separate element secured to the second support member in a known manner, while the ball portion of such a joint is provided as an integral portion of a stud fixed to the first support member by a nut threaded onto the threaded end of the stud. Conventionally, such a stud is provided with a tapered or frusto-conical intermediate portion that is seated in a corresponding tapered aperture in the first support member and, accordingly, such a stud with a ball at the end thereof is commonly referred to as a tapered shank ball stud, or simply a ball stud.

Normally in such an assembly as used in a vehicle, the ball and socket joint is protected against the entry of dirt or other foreign particles therein by means of a suitable seal, such as a rubber seal, partly encircling the ball and joint assembly. Because of such a rubber seal and the damage that may be caused by end loading a ball stud, it is not normally convenient or practical to hold such a ball stud, as by a holding tool, when driving the attaching nut. Because of this, it has been conventional to use a free spinning nut rather than a nut of the prevailing torque type to effect fastening of the ball stud. With a free spinning nut, the axial load seats the taper such that the resisting torque of the ball stud exceeds the nut applied torque. Usually, the free spinning nut is of the slotted or castellated type whereby a cotter pin can be used to effect locking of the nut. Prevailing torque type nuts have commonly not been used because this type nut cannot be driven far enough to seat the tapered portion of the ball stud into the tapered aperture of its associated support member and, accordingly, the proper attachment cannot be insured.

It has previously been proposed, as disclosed, for example, in U.S. Pat. No. 3,325,196 issued June 13, 1967 to Louis P. Noirot, that a conical collar of elastic material or a coiled spring be interposed between the nut and the surface of the support member in a joint assembly using a tapered shank ball stud so that a prevailing torque type nut can be used to effect attachment of this type assembly. As disclosed in U.S. Pat. No. 3,325,196, if a collar is used, it should be of truncated conical shape whereby the base of the collar that is intended to bear against the surface of the support member has a greater diameter than the opposite end of the collar which is intended to bear against the bearing face of the prevailing torque type nut as it is torqued downward toward the support member. Such a collar forms no useful part of the final assembly and, accordingly, in accordance with the disclosure in the above-identified U.S. Pat. No. 3,325,196, it is conveniently constructed so as to be attached to the lower peripheral surface of the nut in a manner so that, if desired, it can be removed after the assembly has been completed. If a coiled spring is used, a cavity must be provided at the lower face of the nut, as disclosed in the above-identified U.S. Pat. No. 3,325,196 to contain the spring after it has been compressed in order to enable the clamping face of the nut to contact the confronting face of the support member. It will be apparent that if either the collar or a coiled spring, as disclosed in the above-identified U.S. Pat. No. 3,325,196, is used in such an articulated joint assembly to permit the usage of a prevailing torque type nut, as the lock nut for the assembly, that if a commercially standard size nut is used in such an assembly, the effective bearing surface of such a nut is greatly reduced.

It is therefore a primary object of this invention to provide an improved tapered shank ball stud assembly wherein a collapsing washer is interposed between a nut and the support member receiving the ball stud whereby the nut used can be of the prevailing torque type.

Another object of this invention is to provide an improved collapsing washer for use with a tapered shank ball stud in an articulated joint assembly whereby a prevailing torque type nut can be used to effect attachment of the ball stud to its associated support member.

These and other objects of the invention are obtained by the use, in an articulated joint assembly, of a collapsing washer, of original C-shaped annular configuration, for attaching the tapered shank ball stud of such an assembly to the support member of the assembly having a tapered aperture therethrough to seatingly receive this tapered shank portion of the ball stud, the washer being positioned to encircle the ball stud for abutment on one side against the surface of the support member and at its other side abutting against the bearing surface of a prevailing torque type nut before locking engagement begins between the locking element of the nut and the external threads on the ball stud whereby an axial load is applied to the ball stud in a direction to effect positive seating of the tapered portion of the ball stud into the tapered aperture of the support member to prevent rotation of the ball stud so that the nut can be torqued down, as necessary, the washer collapsing during torque down of the nut so that, in the final assembly, the washer is of a flat ring-like configuration providing bearing surfaces as sandwiched between the surface of the support member and the bearing surface of the nut.

For a better understanding of the invention, as well as other objects and further features thereof, reference is had to the following detailed description of the invention to be read in connection with the accompanying drawings, wherein.

Figure 1:
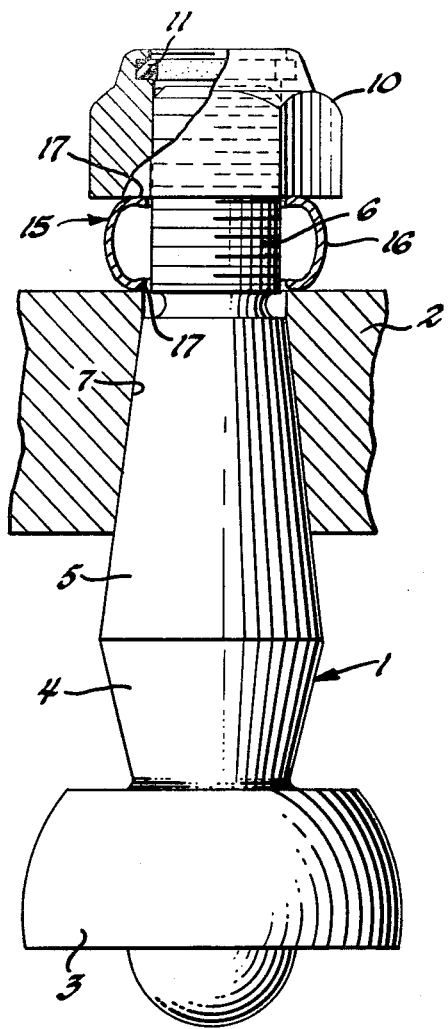
FIG. 1 is an elevational view, with parts in section or broken away, of a portion of an articulated joint assembly with the attachment of the ball stud of the assembly being effected by means of a collapsing washer in accordance with the invention, and showing the initial assembly of these elements.

Referring now to FIG. 1, there is shown a tapered shank ball stud 1 that is to be fixed to a support member 2 for use as part of an articulated joint assembly, of the type well known in the art. The ball stud 1 includes a truncated ball 3 having a stud 4 thereon provided with a tapered portion 5 terminating in a threaded end having external threads 6. The support member 2 is provided with a conical tapered aperture 7 therethrough, hereinafter referred to as the tapered aperture 7. In the construction illustrated, a prevailing torque type nut or lock nut 10 is used to fix or secure the ball stud to the support member 2. Although the nut 10 can be of any well known prevailing torque type, in the construction illustrated, it is of the type that is provided with an internal non-screw threaded insert ring 11, made of suitable deformable material, such as nylon, as is well known in the art.

It will be apparent to those skilled in the art that the nut 10, in being threaded onto the ball stud 1 to the position shown in FIG. 1, is relatively free spinning up to this position and can be threaded to this position without the application of any appreciable torque to the ball stud. However, it will be apparent that, as soon as the nut 10 is driven further onto the threads 6 on the end of the ball stud, the threads 6 will come into engagement with and cause deformation of the insert ring 11 so that considerable torque must then be applied to the ball stud 1 to prevent its rotation since the driving torque applied to the nut is abruptly increased at the moment the threads 6 come into contact with the insert ring 11. Because of its configuration, it is apparent that even if the ball end of the ball stud is accessible to an operator, there is no practical way to retain it against rotation during torque down of the nut. It will also be apparent that, even if the ball 3 of the ball stud is mounted in the socket housing of a second support member, not shown, the holding of such a second member would not prevent rotation of the ball stud since the basic object of such a ball and socket assembly is to permit movement between the respective parts of such an assembly.

Now in accordance with the invention, a collapsing washer, generally designated 15, is positioned to loosely encircle the threaded end of the ball stud in position between the support member 2 and the lock nut 10 to effect fastened assembly of the ball stud to the support member. The collapsing washer 15 has an original configuration and is of a predetermined axial extent so that, during initial torqueing down of the nut 10, that is, during free spinning engagement of the nut with the threads 6, the washer will generate sufficient axial load to effect axial movement of the ball stud in a direction, upward with reference to FIG. 1, whereby its tapered shank 5 will become fully seated in the tapered aperture 7 of the support member to thereby prevent ball stud rotation throughout the remaining time that the nut 10 is being driven to its final seated position, the position shown in FIG. 2.

The collapsing washer, in its original, as assembled, configuration, is of a C-shaped annulus configuration having an annular arcuate bight 16 connecting together a pair of annular curved legs 17. Each of the legs 17 extends radially inward from the bight 16 and has its free internal end extending at least parallel to but, preferably, extending slightly toward the other leg, for a purpose which will become apparent.

The collapsing washer 15 is made of a suitable ductile readily deformable material, such as copper or steel, and can conveniently be made from appropriately dimensioned seamless tubing. In a particular embodiment, the collapsing washer was made from an SAE 1008/1010 steel seamless tubing ½ inch long and having a 0.680 inch outside diameter. The outside diameter of this tube is significantly larger than the major diameter of the external threads 6 of the ball stud 1 with which it is to be used. The tube is then formed on progressive dies by swaging to flatten the ends to form the legs 17, as shown in FIG. 1. As the ends of the tube are flattened, the material therein forming the legs 17 retain a very large amount of compressive stress, this compressive stress being very important in controlling the form the washer takes as it collapses, in the manner to be described. As the ends of the tube are flattened to form the legs 17, the side of the tube is allowed to swell outward in the center, for example, 4° to 7°, to form the arcuate bight 16, thus giving the washer a somewhat barrel shaped configuration on its sides, as best seen in FIG. 4. The collapsing washer 15, as thus formed, when in its original, as assembled, configuration, as shown in FIG. 1 and the top view in FIG. 3, has a minor inside diameter, that is, a diameter corresponding to the inside diameter of the legs 17, sufficiently large so that this washer will loosely encircle the threads 6 of the ball stud 1 so that this washer will not jam into the threads 6.

Referring again to FIG. 1, the axial extent of the collapsing washer 15 in its original, as assembled, configuration shown in this figure should be pre-selected so that, during assembly, the tapered shank portion 5 of the ball stud 1 can be substantially seated in the tapered aperture 7 of support member 2 and with the nut 10 threaded onto the threads 6 of the ball stud within, for example, several threads out of engagement of the insert ring 11 in the nut, one leg 17 of the washer will abut against the outer or upper surface, with reference to FIG. 1, of the support member 2, while the other leg 17 engages the bearing surface of the nut 10, that is, the underside surface of this nut. With this arrangement, further torqueing down of the nut 10 will then cause the collapsing washer 15 to generate sufficient axial load relative to the ball stud so as to effect axial movement thereof, as required, to effect its full seated binding engagement with the internal wall of the support member defining the outer boundaries of the tapered aperture whereby the ball stud is then prevented from rotating relative to the support member 2. The nut 10 can then be torqued down to its final assembled position, the position shown in FIG. 2, causing the collapsing washer 15 to collapse approximately about the midpoint of the bight 16 so that this collapsing washer in its final configuration is of flat ring-like washer configuration.

Figure 3:
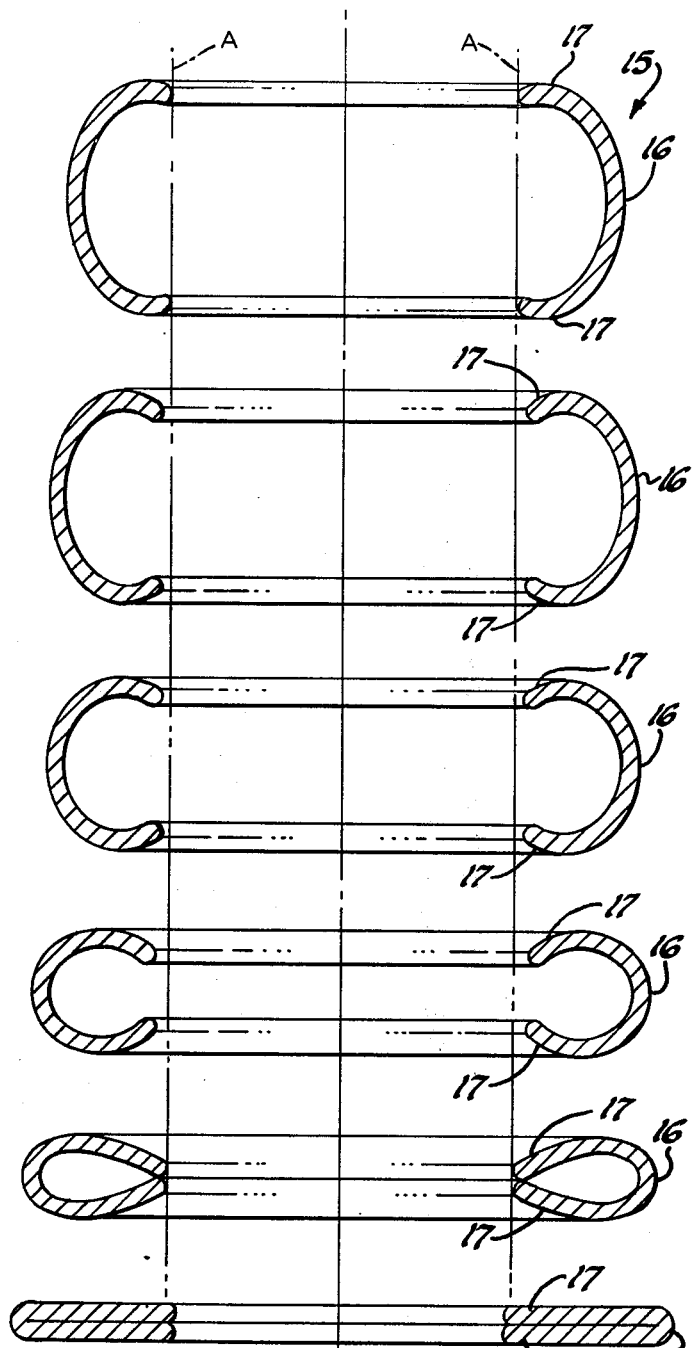
FIG. 3 is an enlarged diagrammatic illustration of the various stages in the deformation of the collapsing washer, per se, from its as assembled shape, shown in FIG. 1, to its collapsed shape, as shown in FIG. 2; and, FIG. 4 is a perspective view of the collapsing washer, per se, in its original, as assembled, configuration.
Figure 4:
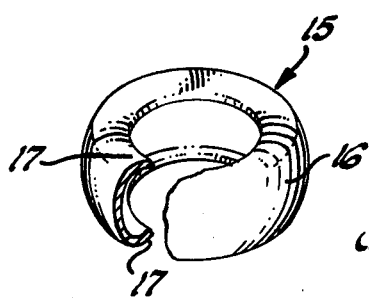

Referring now to FIG. 3, there is shown diagrammatically how the washer 15 collapses without jamming the threads 6 of the ball stud, the top view of this figure showing the washer in its original, as assembled, configuration and, as can be seen by the next lower figure, as the washer is initially compressed between the support member 2 and the nut 10, the ends of the legs 17 thereof turn in automatically due to the outward expansion of the bight 16 thereof and the heavy compressive stress at the minor diameter thereof. The various stages during the collapse of the washer shown in this figure clearly shows that, during compression, the washer expands significantly at the center of its bight portion so that the effective minor inside diameter increases whereby to compensate for any sideways movement that may be caused by non-parallel compressing surfaces at opposite ends of the washer, the vertical lines A—A showing the boundaries of the original inside diameter of the washer. Only when the ends of the legs 17 touch, as shown in the second view from the bottom of FIG. 3, does the minor diameter again start to reduce. At final collapse of the washer 15, the minor diameter is still sufficiently large so that no measurable torque build-up caused by thread jamming will occur.

Figure 2:
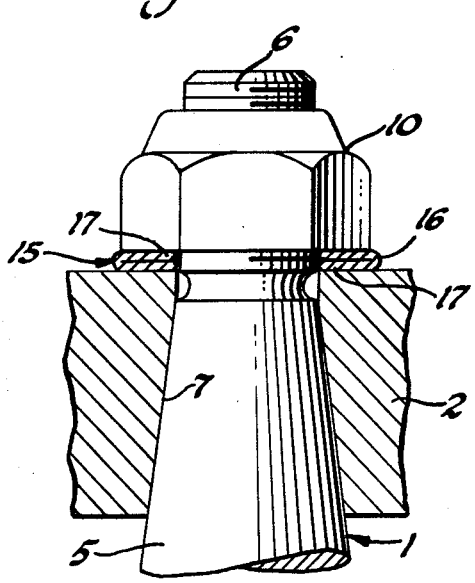
FIG. 2 is a partial view similar to FIG. 1, showing the position of the various elements of the assembly in their fully assembled positions.

It should be realized, of course, that the final collapse of the washer 15 to its collapsed configuration, as shown in FIG. 2 and in the bottom view of FIG. 3, must occur before minimum nut torque is reached and after the required surface load has been applied to the tapered portion of the ball stud. Thus, by proper dimensioning of the collapsing washer 15, the final collapse of the washer to the collapsed position shown in FIG. 2 can give an operator a visual indication that the tapered portion of the ball stud has been adequately seated in the support member 2 and that sufficient nut torque has been applied to the nut 10 to effect the desired assembly of these parts.

Again referring to FIG. 3, it will be apparent that there is somewhat of a rolling action between the legs 17 of the washer 15 and the bearing surface of the nut 10 and the upper surface of the support member whereby to insure that different surfaces of these legs are coming into contact with the cooperating surfaces of the nut and support member as the collapse of the nut takes place. These constantly changing contact surfaces prevent local heat build-up and galling of the engaging surfaces between these elements. Of course, heat build-up and galling can also be effectively reduced by coating the outer surface of the collapsing washer with a suitable lubricant, such as oil or even phosphate, it being noted that in a vehicle application, such a part would normally be phosphated to prevent corrosion. However, by proper configuration of the collapsing washer, the use of such a lubricant is not necessary to prevent galling for the reasons described above.

Although in the construction illustrated, the nut has been provided with an insert 11 to provide the desired prevailing torque locking feature, it will be readily apparent to those skilled in the art that other deformable friction increasing means may be used to provide the prevailing torque locking feature and this this could be provided either on the nut 10, as shown, or on the external threads 6 of the ball stud, as well known in the art, it only being necessary that such prevailing torque feature be located so that the collapsing washer 15 will be operative to generate sufficient axial load to seat the taper and prevent stud rotation before such prevailing torque feature comes into operation during torqueing down of the nut 10 on the threads 6.

What is claimed is:

1. In an articulated joint assembly including a tapered shank ball stud, a support member having a tapered aperture therethrough to receive the tapered shank of said ball stud in seated engagement therewith and, a nut having internal threads in engagement with the external threads on the free end shank portion of said ball stud, said nut being provided with a self-locking deformable means associated with said internal threads located in said nut so as to engage the external threads of said ball stud after a predetermined threaded engagement of said nut onto said ball stud, the improvement comprising a washer positioned to loosely encircle the shank of said ball stud between said support member and said nut, said washer in its original, as assembled, configuration on said ball stud being a ring-like collapsing washer of C-shaped annulus configuration having an annular arcuate bight connecting together a pair of annular curved legs, each said leg extending radially inward from said bight and having its free, internal end of a configuration so that during collapse of said washer said end of one said leg will move toward the other of said legs, the major axial extent between said legs in the original configuration of said washer being preselected relative to the threaded end of said ball stud extending outward from said member so that with said tapered shank substantially seated in said tapered aperture in said support member one of said legs will abut against said support member and the other of said legs will abut against said nut when it is partly threaded onto said ball stud prior to said self-locking means engaging said external threads of said ball stud, whereby as said nut is driven down said ball stud, said collapsing washer will effect axial movement of said ball stud whereby said tapered shank becomes fully seated in said tapered aperture of said support member locking said ball stud against rotation relative to said support member whereby said nut can be fully torqued down to effect collapsing of said washer substantially about the axial midpoint of said bight so that said legs come into abutment against each other in sandwiched relation between said support member and said nut, said washer as thus collapsed being of flat ring-like washer configuration.

2. In the combination including a member having a tapered aperture therethrough, a ball stud having a ball at one end thereof, an intermediate tapered shank and an externally threaded shank at its opposite end, said ball stud extending through said tapered aperture in position to have said tapered shank seat therein, a nut having internal threads in threaded engagement with the external threads of said ball stud and, a self-locking deformable means operatively associated with said nut and said external threads in position so as to become engaged after a predetermined thread engagement of said nut axially onto said ball stud, the improvement comprising a deformable washer positioned to encircle the externally threaded shank of said ball stud between said member and said nut, said washer in its original configuration as assembled onto said ball stud being of C-shaped annulus configuration having an annular arcuate bight connecting together a pair of curved legs, each said leg extending radially inward from said bight and at its free end toward the other of said legs, the major axial extent of said washer being preselected so that when said tapered shank is substantially seated in said tapered aperture one of said legs will abut against said member and the other will abut against said nut prior to said self-locking deformable means becoming engaged whereby said washer will effect axial movement of said ball stud in a direction to effect full seating of said tapered shank into said tapered aperture upon further rotation of said nut so as to prevent rotation of said ball stud relative to said member, said deformable washer collapsing into a flat ring-like washer when said nut is fully torqued down onto said external threads, said self-locking deformable means being deformed during the torque down of said nut.

3. A method of securing the tapered shank of a tapered shank ball stud to a support member having a tapered aperture extending from a first side through to an opposed second side of the support member to receive said tapered shank, said tapered shank having external threads on the free end thereof, said method including the steps of inserting said tapered shank from said second side into said tapered aperture to extend through said support member sufficiently so that said tapered shank is loosely mated in said tapered aperture with said external threads of said tapered shank extending beyond said first side, positioning a deformable washer of C-shaped annular configuration and of a predetermined axial extent onto said free end of said tapered shank so as to loosely encircle said tapered shank, threading a prevailing torque type lock nut, having internal threads with a self-locking deformable means associated with said internal threads, onto said external threads of said tapered shank to a position at which one side of said washer abuts against said first side of said support member and the opposite side of said washer abuts against said lock nut before said self-locking deformable means engages said external threads, and continuing torque down of said lock nut on said external threads whereby said washer is operative to apply an axial load via said lock nut onto said tapered shank ball stud in an axial direction to effect positive seating of said tapered shank into said tapered aperture to thereby prevent rotation of said tapered shank relative to said support member whereby said lock nut can then be torqued down until said washer is collapsed into a flat ring like washer sandwiched between said first side of said support member and one side of said lock nut.

4. In a method of securing a tapered shank ball stud to a support member wherein said tapered shank ball stud has a tapered shank with external threads on the free end thereof and wherein the support member has a first side and an opposed second side with a tapered aperture therethrough of a size and shape corresponding to the exterior of said tapered shank, the steps of inserting said tapered shank into said tapered aperture so that said tapered shank is substantially but loosely mated in said tapered aperture with said free end of said tapered shank extending outward from said one side of said support member, providing a deformable washer of C-shaped annular configuration having an annular arcuate bight connecting together first and second annular curved legs extending radially inward from said bight to loosely encircle said tapered shank, providing a lock nut of the prevailing torque type with a self-locking deformable means associated with the internal threads of the lock nut, threaded onto the external threads of said tapered shank, said washer in its C-shaped configuration having an axial extent so that during free spinning engagement of said lock nut on said external threads said lock nut will abut against said first curved leg while said second curved leg abuts against said one side of said support member whereby to effect movement of said tapered shank in an axial direction to become fully seated in said tapered aperture to thereby prevent rotation of said tapered shank relative to said support member, and driving said lock nut down on said tapered shank to a seated position will cause said washer to collapse into a flat ring like washer configuration that is sandwiched between said lock nut and said support member.

* * * * *